United States Patent
Zhang et al.

(10) Patent No.: US 11,649,925 B2
(45) Date of Patent: May 16, 2023

(54) MULTISTABLE COMPLIANT MECHANISM AND A STEADY-STATE ANALYSIS METHOD THEREOF

(71) Applicant: South China University of Technology, Guangzhou (CN)

(72) Inventors: Xianmin Zhang, Guangzhou (CN); Hongchuan Zhang, Guangzhou (CN); Benliang Zhu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 376 days.

(21) Appl. No.: 16/981,831

(22) PCT Filed: Oct. 22, 2018

(86) PCT No.: PCT/CN2018/111206
§ 371 (c)(1),
(2) Date: Sep. 17, 2020

(87) PCT Pub. No.: WO2019/179092
PCT Pub. Date: Sep. 26, 2019

(65) Prior Publication Data
US 2020/0408359 A1    Dec. 31, 2020

(30) Foreign Application Priority Data

Mar. 19, 2018  (CN) .......................... 201810223057.6

(51) Int. Cl.
*F16S 5/00*     (2006.01)
*B25J 9/00*     (2006.01)
(Continued)

(52) U.S. Cl.
CPC .............. *F16S 5/00* (2013.01); *B25J 9/0015* (2013.01); *F16S 1/00* (2013.01); *G01M 13/00* (2013.01); *B64G 99/00* (2022.08)

(58) Field of Classification Search
None
See application file for complete search history.

(56) References Cited

U.S. PATENT DOCUMENTS

| 6,264,199 B1 * | 7/2001 | Schaedel ................. A63F 9/088 |
| | | 273/157 R |
| 9,783,977 B2 * | 10/2017 | Alqasimi .............. E04B 1/3441 |
| 2010/0116080 A1 | 5/2010 | Pistor et al. |

FOREIGN PATENT DOCUMENTS

| CN | 101798053 A | 8/2010 |
| CN | 101901701 A | 12/2010 |

(Continued)

OTHER PUBLICATIONS

CN 105697703 A, IDS record, translation (Year: 2016).*

*Primary Examiner* — Lina M Cordero
(74) *Attorney, Agent, or Firm* — The Webb Law Firm

(57) ABSTRACT

A multistable compliant mechanism is formed by connecting sequentially multiple basic units front to end to form a closed annular structure. Each basic unit includes two flexible hinges perpendicular to each other on different planes and two rigid connection parts for connecting the flexible hinges. The two flexible hinges are connected by a rigid connection part, and one of the flexible hinges is connected to a flexible hinge of an adjacent basic unit through the other rigid connection part. Lengths of two rigid connection parts in a same basic unit are equal, but lengths of rigid connection parts of different basic units are not necessarily equal. The multistable compliant mechanism features the continuous rotation and multi-steady state of a tri-compliant mechanism. The multistable compliant mechanism also features variable mechanism topology, an adjustable unit number, easy implementation, and promotion. A method for steady state analysis of the multistable compliant mechanism is also provided.

5 Claims, 6 Drawing Sheets

(51) Int. Cl.
    *G01M 13/00*     (2019.01)
    *F16S 1/00*     (2006.01)
    *B64G 99/00*     (2009.01)

(56) References Cited

FOREIGN PATENT DOCUMENTS

| | | |
|---|---|---|
| CN | 102705461 A | 10/2012 |
| CN | 105697703 A | 6/2016 |
| CN | 107140237 A | 9/2017 |
| CN | 108515511 A | 9/2018 |
| CN | 108515580 A | 9/2018 |
| TW | 201806846 A | 3/2018 |
| WO | WO-9211911 A1 * 7/1992 | ............. A63F 9/088 |

\* cited by examiner

US 11,649,925 B2

MULTISTABLE COMPLIANT MECHANISM AND A STEADY-STATE ANALYSIS METHOD THEREOF

CROSS-REFERENCE TO RELATED APPLICATIONS

This application is the United States national phase of International Application No. PCT/CN2018/111206 filed Oct. 22, 2018, and claims priority to Chinese Patent Application No. 201810223057.6 filed Mar. 19, 2018, the disclosures of which are hereby incorporated by reference in their entirety.

BACKGROUND OF THE INVENTION

Field of the Invention

The invention relates to the technical field of a compliant mechanism, in particular to a multistable compliant mechanism and a steady-state analysis method thereof.

Description of Related Art

A compliant mechanism refers to a device that transmits input force and displacement through elastic deformations. The compliant mechanism has the advantages of no gap, no lubrication, no assembly required, high precision, high rigidity, etc. and has been widely used in various fields of life.

During the development of compliant mechanisms, some mechanisms in motion were found to have one or several stable positions. This phenomenon is called the steady-state behavior of compliant mechanisms, and the state where these mechanisms are in stable positions is called the steady state of compliant mechanisms. Therefore, the steady-state position of these mechanisms is often located at the point where the potential energy of the mechanism is at its minimum. According to the number of steady states of the compliant mechanism, we divide the steady state of the compliant mechanism into monostable state, bistable state and multi-stable state. Among them, the bistable compliant mechanism has been widely used in switches, transistors and some positioning devices. Although some tri-stable or multi-stable compliant mechanisms have been proposed, multi-stable compliant mechanisms have not received enough attention.

The mainstream design methods of existing compliant mechanisms include pseudo rigid body methods (PRBMs) and topology optimization methods. Most of the compliant mechanisms designed by these two types of methods are also mostly bistable or tristable. However, the design of multi-steady state mechanisms is still a difficult problem.

In recent years, compliant mechanisms inspired by origami mechanisms are getting more and more attention. Due to actual crease of origami regarded as a flexible hinge, many origami inspired compliant mechanisms with multiple steady states have been proposed. Origami technology has become a new design method for multi-stable compliant mechanisms.

Origami kaleidocycles have been given attention by scholars because of their continuous rotation and multi-stable state. Especially its continuous rotation performance breaks the shortcoming that a compliant mechanism cannot withstand continuous movement. At present, there are already three-fold kaleidocycles designed as three-fold symmetric bricard compliant mechanisms.

A three-fold kaleidocycle mechanism is a kind of space mechanism which is formed by revolving pairs and connecting rods. A three-fold kaleidocycle mechanism belongs to a spatial over-constraint mechanism in terms of the study of mechanism, and the adjacent joints of the mechanism present a perpendicular distribution and the degree of freedom of the mechanism is 1. A three-fold kaleidocycle compliant mechanism is limited by its fixed triangular mechanism topology, with fewer design changes, and a limited scope of application, which could not satisfy all working conditions very well. When there are more than three units of kaleidocycles, the mechanism becomes a mechanism with multiple degrees of freedom. The analysis of the described mechanisms are complicated and there are few studies on it.

SUMMARY OF THE INVENTION

The purpose of the present invention is to overcome the limitation of the single application scenario of the triangular topology structure of the existing three-fold kaleidocycles, enhance the design of compliant mechanism, expand the application of the compliant mechanism, propose a multi-stable compliant mechanism with a compact structure, simple and reliable, convenient for processing, which can adapt to a variety of complex working conditions, and its steady state analysis method. In addition to the continuous rotation, multiple steady states, and other advantages inherited from the tri-compliant mechanism, the mechanism also has the advantages of variable mechanism topology, adjustable number of units, easy to implement and promote.

To achieve the above objectives, the technical solutions provided by the present invention are as follows:

A multistable compliant mechanism, the multistable compliant mechanism is formed by connecting sequentially at least four basic units front to end to form a closed annular structure; each basic unit comprises two flexible hinges perpendicular to each other on different planes and two rigid connection parts for connecting the flexible hinges, the two flexible hinges are connected by a rigid connection part, and one of the flexible hinges is connected to a flexible hinge of an adjacent basic unit through the other rigid connection part, lengths of two rigid connection parts in a same basic unit must be equal, but lengths of rigid connection parts of different basic units are not necessarily equal.

The multistable compliant mechanism has four types: monostable, bistable, tri-stable, and quad-stable; wherein each basic unit must meet the following size constraints:

$$\frac{\omega_{01}}{\omega_{02}} = \frac{\cos(\theta_{n+1})}{\cos(\theta_{n-1})} \cdot \left(\frac{L_{n-1} + L_n \cos(\theta_n)}{L_n + L_{n-1} \cos(\theta_n)}\right)$$

In the above formula, $\omega_{01}$ and $\omega_{02}$ are input and output rotational-angular velocities of a basic unit, $L_{n-1}$ and $L_n$ are the lengths of the two rigid connection parts in the basic unit, $\theta_{n-1}$ and $\theta_n$ are deflection angles of the two flexible hinges in the basic unit, $\theta_{n+1}$ is a joint offset angle between a next basic unit and a current basic unit; to form the closed annular structure, each basic unit must have a same rotational angular velocity according to the above formula, and then form an annular structure that can be rotated stably;

Two adjacent hinges of each basic unit have a same angle change rules, and a kinematic relationship from an initial state and when rotated to any angle is:

$$\begin{cases} \theta_1 = 2\arccos\left(\dfrac{\cos\left(\dfrac{\varphi}{2}\right)}{\cos\left(\dfrac{\theta_2}{2}\right)}\right)\text{sign}(\sin(\tau)) \\ \theta_2 = 2\arcsin\left(\sin(\tau)\sin\left(\dfrac{\varphi}{2}\right)\right) \\ \varphi = \dfrac{2\pi}{n} \end{cases}$$

In the above formula, $\theta_1$ and $\theta_2$ are deflection angles of the two flexible hinges of the basic unit, $\tau$ is a rotational angle of the entire mechanism relative to an initial zero position, n is a number of basic units of the entire mechanism, and $\varphi$ is a constant related to n;

Steady-state positions of the multistable compliant mechanism are all located at points where a potential energy of the mechanism is minimum, the formula are as follows:

$$\begin{cases} U = n\left(K_1 \cdot \dfrac{(\theta_1 - \theta_{01})^2}{2} + K_2 \cdot \dfrac{(\theta_2 - \theta_{02})^2}{2}\right); \\ U_r = \dfrac{U}{n}; \\ r = \dfrac{K_2}{K_1}; \\ f_1 = \dfrac{\theta_1 - \theta_{01}}{\tan(\theta_1)}; \\ f_2 = \dfrac{\theta_2 - \theta_{02}}{\tan(\theta_2)}; \\ \dfrac{dU_r}{d\tau} = K_1 \cdot \dfrac{d\theta_1}{d\tau} \cdot \tan(\theta_1) \cdot (f_1 - r \cdot f_2); \\ \dfrac{d^2 U_r}{d\tau^2} = 0; \\ \dfrac{dU_r}{d\tau} > 0; \end{cases}$$

In the above formula, U is an overall strain energy of the mechanism, $U_r$ is a total strain energy of a basic unit, $K_1$ and $K_2$ are respectively stiffness of two flexible hinges of a basic unit, $\theta_1$ and $\theta_2$ are respectively deflection angles of the two flexibility hinges of the basic unit, $\theta_{01}$ and $\theta_{02}$ are zero offset angles of the two flexible hinges of the basic unit, r represents a ratio of stiffness of the two flexible hinges of the basic unit, $f_1$ and $f_2$ are respectively related to $\theta_{01}$, $\theta_1$ or $\theta_{02}$, $\theta_2$ and are used to analyze a steady-state transition function of the mechanism;

A plane formed by the parameters $\theta_{01}$ and $\theta_{02}$ can be divided into a monostable area, a bistable area, a tri-stable area, and a quad-stable area according to a number of steady-states represented by the multistable compliant mechanism, and a parameterized formula of a boundary curve dividing these areas is:

$$\begin{cases} \theta_{01} = \theta_1 - \dfrac{\theta_2' \cdot (\theta_1'^2 + r \cdot \theta_2'^2)}{\theta_1' \cdot \theta_2'' - \theta_2' \cdot \theta_1''}; \\ \theta_{02} = \theta_2 - \dfrac{\theta_1' \cdot (\theta_1'^2 + r \cdot \theta_2'^2)}{r \cdot (\theta_2' \cdot \theta_1'' - \theta_1' \cdot \theta_2'')}; \\ \theta_i' = \dfrac{d\theta_i}{d\tau}, i = 1, 2; \\ \theta_i'' = \dfrac{d^2\theta_i}{d\tau^2}, i = 1, 2; \end{cases}$$

where $\theta_1'$ and $\theta_1''$ are respectively a first derivative and a second derivative of $\theta_1$ with respect to the rotational angle $\tau$, $\theta_2'$ and $\theta_2''$ are respectively a first derivative and a second derivative of $\theta_2$ with respect to the rotational angle $\tau$; along the direction of the curve, a number of tangents passing through coordinate point $(\theta_{01}, \theta_{02})$ corresponding to specific values of mechanism parameters $\theta_{01}$ and $\theta_{02}$ is the number of steady-states of the mechanism; an intersection of the tangents and a kinematic curve formed by $\theta_{01}$ and $\theta_{02}$ is a steady-state position of the mechanism.

The flexible hinges are spring hinges, straight beam flexible hinges or notch flexible hinges etc.

The rigid connection parts are connecting rods.

A steady-state analysis method for a multistable compliant mechanism above of the present invention, comprises the following steps:

1) determining a number n of basic units, a basic shape and a basic size of each basic unit can vary, but corresponding stiffness of flexible hinges perpendicular to each other on different planes must be the same;

2) determining a type of flexible hinges of a basic unit, and according to the determined type of flexible hinges, combining relevant theory of compliant mechanism to determine its stiffness $K_1$, $K_2$ and the ratio r, if the selected flexible hinges are straight beam flexible hinges, their stiffness is obtained according to the following formula:

$$\begin{cases} K_i = \dfrac{EI}{L}, (i = 1, 2); \\ I = \dfrac{bh^3}{12}; \end{cases}$$

where E is the Young's modulus of the material of the straight beam type flexible hinges, b and h are respectively the cross-sectional width and thickness of a straight beam type flexible hinge, and I is the cross-sectional moment of inertia of a straight beam flexible hinge;

3) determining zero offset angles $\theta_{01}$ and $\theta_{02}$ of the flexible hinges of the kaleidocycle unit, according to the following formula:

$$\begin{cases} r = \dfrac{K_2}{K_1}; \\ f_1 = \dfrac{\theta_1 - \theta_{01}}{\tan(\theta_1)}; \\ f_2 = \dfrac{\theta_2 - \theta_{02}}{\tan(\theta_2)}; \end{cases}$$

4) drawing curves of the term $f_1/f_2$, and find all intersection points of it with the stiffness ratio r, if intersection point cannot be found or the curves of $f_1/f_2$ cannot be drawn, then directly go to step 6);

5) finding a steady-state point of the mechanism according to a numerical sign of the following expression:

$$K_1 \cdot \dfrac{d\theta_1}{d\tau} \cdot \tan(\theta_1)$$

If it is positive, the steady-state point appears at a point where the function $f_1/f_2$ crosses r positively from bottom to top; if it is negative, the steady-state point appears at a point where the term $f_1/f_2$ crosses r negatively from top to bottom; after the steady state point is determined, if there is only one steady-state point, the mechanism is a monostable mechanism; if there are two steady-state points, the mechanism is a bistable mechanism; if there are three steady-state points, the mechanism is a tri-stable mechanism; if there are four steady-state points, the mechanism is a quad-stable mechanism; wherein the rotational angle τ corresponds to a steady-state point above is a steady-state position of the mechanism;

6) drawing an image according to the parameterized formula of a steady-state area boundary curve of the following formula:

$$\begin{cases} \theta_{01} = \theta_1 - \dfrac{\theta'_2 \cdot (\theta'^2_1 + r \cdot \theta'^2_2)}{\theta'_1 \cdot \theta''_2 - \theta'_2 \cdot \theta''_1}; \\ \theta_{02} = \theta_2 - \dfrac{\theta'_1 \cdot (\theta'^2_1 + r \cdot \theta'^2_2)}{r \cdot (\theta'_2 \cdot \theta''_1 - \theta'_1 \cdot \theta''_2)}; \\ \theta'_i = \dfrac{d\theta_i}{d\tau}, (i = 1, 2); \\ \theta''_i = \dfrac{d^2\theta_i}{d\tau^2}, (i = 1, 2); \end{cases}$$

Determining a position of the point ($\theta_{01}$, $\theta_{02}$) corresponding to the zero offset angles $\theta_{01}$ and $\theta_{02}$ of the flexible hinges of actual basic units, and determining a steady-state area where it locates, then determining a number of its steady-state, if the point locates in the monostable area, the mechanism is a monostable mechanism; if the point locates in a bistable area, the mechanism is a bistable mechanism; if the point locates in a tri-stable area, the mechanism is a tri-stable mechanism; if the point locates in a quad-stable area, the mechanism is a quad-stable mechanism; finding tangents of the boundary curve of the steady-state area passing through the point ($\theta_{01}$, $\theta_{02}$), and finding intersection points of these tangents and kinematics relationship curves of $\theta_1$ and $\theta_2$, these intersection points are the steady-state points of the mechanism;

$$\begin{cases} \theta_1 = 2\arccos\left(\dfrac{\cos\left(\dfrac{\varphi}{2}\right)}{\cos\left(\dfrac{\theta_2}{2}\right)}\right)\text{sign}(\sin(\tau)) \\ \theta_2 = 2\arcsin\left(\sin(\tau)\sin\left(\dfrac{\varphi}{2}\right)\right) \\ \varphi = \dfrac{2\pi}{n} \end{cases}$$

Finally, finding a steady-state position corresponding to a steady-state point of the mechanism according to the above formula.

Compared with the prior art, the present invention has the following advantages and beneficial effects:
1. The topology structure of the mechanism of the present invention is variable, and it can be adapted to the actual working conditions by changing the number and shape of its basic unit, the layout position of the flexible hinges and the size parameters of the rigid connection part.
2. The invention can have functions such as monostable state, bistable state, tri-stable state and multi-stable state, and its specific position of the steady state can be controlled and adjusted.
3. The invention has underactuated performance and can be realized by only one underactuated torque. There is a force constraint in the rotating process and the symmetric rotating motion can be realized spontaneously.
4. Compared with existing three fold kaleidocycle inspired compliant mechanisms, the deformation of the flexible hinges of the present invention can be limited to a relatively small range, which not only can reduce the interference of the geometric nonlinearity of the flexible deformation, thus simplify the design of the flexible hinges, but also increase the working life of the flexible hinges and increase the working life of the compliant mechanism.

DESCRIPTION

The present invention will be further described below with reference to specific embodiments.

Figure 1:
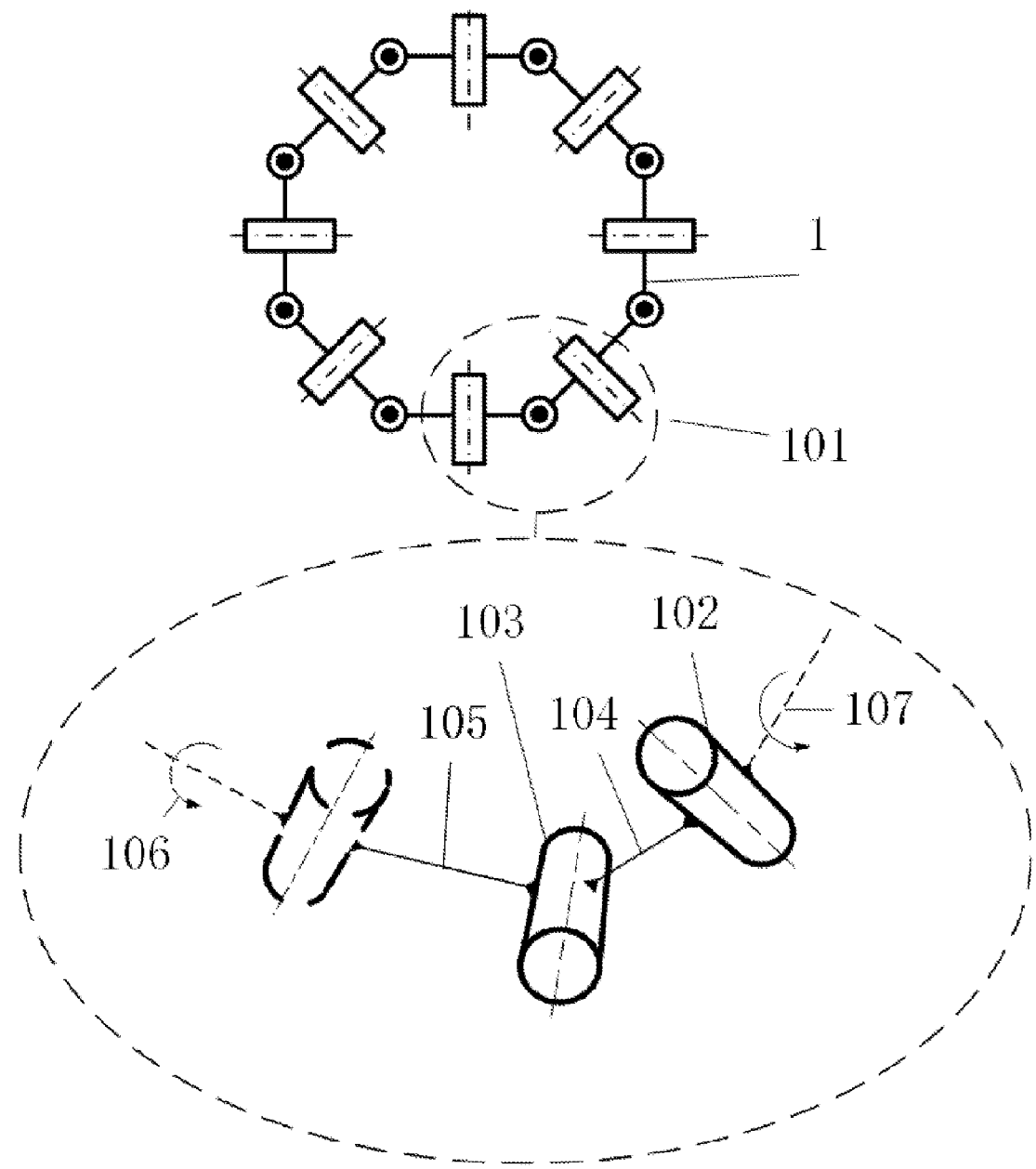
FIG. 1 is a diagram of the topology of the multistable compliant mechanism of the present invention.

As shown in FIG. 1, a multistable compliant mechanism provided in this embodiment is formed by connecting sequentially multiple basic units front to end to form a closed annular structure 1; the basic unit 101 comprises two flexible hinges 102, 103 perpendicular to each other on different planes, and two rigid connection parts 104, 105 (specifically, connecting rods) for connecting the flexible hinges; the flexible hinges 102, 103 have no specific structural limitations. The flexible hinges can be ordinary spring hinges, straight beam flexible hinges or notch flexible hinges etc., and can also be special flexible hinges designed through the relevant theory of the compliant mechanism; the rigidity of the flexible hinge 102 of each basic unit is the same, and the rigidity of the flexible hinge 103 is also the same. The lengths of the rigid parts 104, 105 connecting the two flexible hinges in the same basic unit must be equal, but the lengths of the rigid connecting parts of different basic units can be different; the input and output angular velocities of each basic unit (such as 106, 107 shown in the figure) meet the following size constraints:

$$\dfrac{\omega_{01}}{\omega_{02}} = \dfrac{\cos(\theta_{n+1})}{\cos(\theta_{n-1})} \cdot \left(\dfrac{L_{n-1} + L_n \cos(\theta_n)}{L_n + L_{n-1}\cos(\theta_n)}\right)$$

The number of basic units shown in the figure is 8. The mechanism can also form a variety of configurations by connecting basic units 101 to connecting rod of different sizes, thereby adapting to different working conditions.

Figure 2:
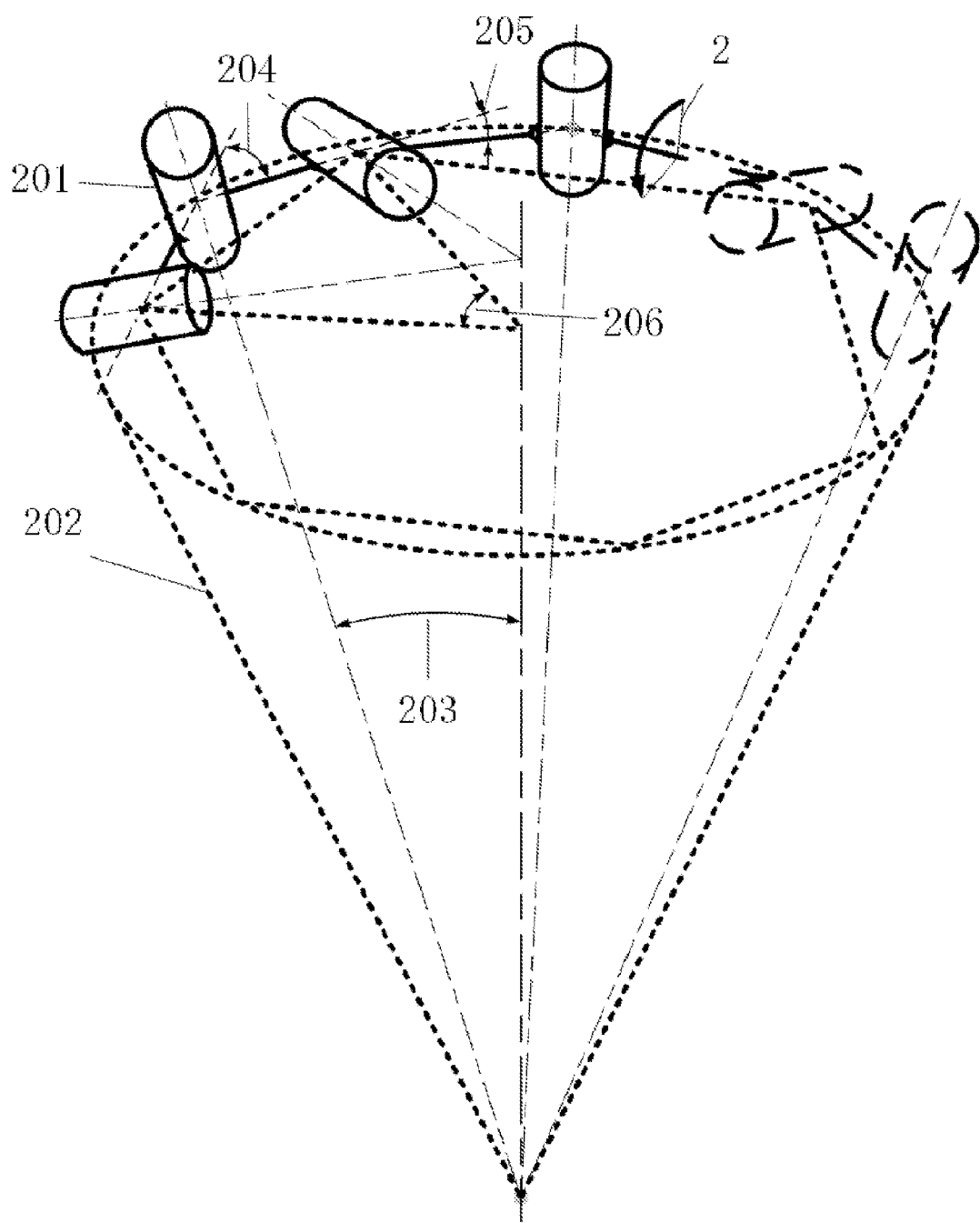
FIG. 2 is a diagram of the kinematic relationship of the multistable compliant mechanism of the present invention.

As shown in FIG. 2, the motion form of the multi-stable compliant mechanism is a rotating motion (as shown in FIG. 2), in which the angle 203 between the rotation axis 201 of the flexible hinge and the central axis of the conical surface 202 where other related hinge axes are located is defined as the rotational angle. When the axes of 201 and 203 are parallel, the two axes do not intersect, the rotational angle at this time is defined as 0 degrees or 180 degrees. The mechanism of the present invention is within the force constraint range. The mechanism movement exhibits underactuated performance, and the rotational angle and the deflection angles $\theta_1$ (204 as shown in the figure), $\theta_2$ (205 shown in the figure) of the flexible hinges of each unit are related to the multi-deformed inner angle $\varphi$ (206 shown in the figure) formed by all the basic units, and their relationship expression is:

$$\begin{cases} \theta_1 = 2\arccos\left(\dfrac{\cos\left(\dfrac{\varphi}{2}\right)}{\cos\left(\dfrac{\theta_2}{2}\right)}\right)\text{sign}(\sin(\tau)) \\ \theta_2 = 2\arcsin\left(\sin(\tau)\sin\left(\dfrac{\varphi}{2}\right)\right) \\ \varphi = \dfrac{2\pi}{n} \end{cases}$$

The mechanism of the present invention will have 1 to 4 steady states during a cycle of rotating, and the rotational angles corresponding to these steady states positions are the steady states positions.

Figure 3:
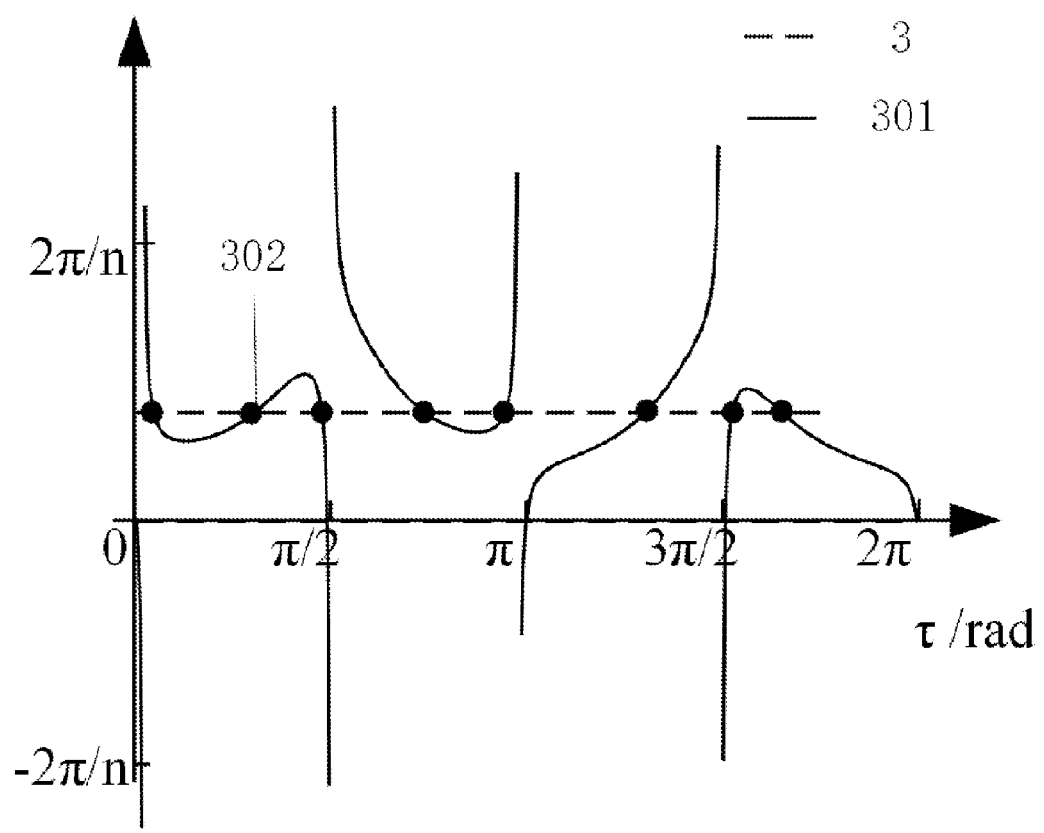
FIG. 3 is a diagram of the analysis of the number of steady states and the position of the steady state when the number and the individual zero offset angles of the basic units of the present invention are known.

As shown in FIG. 3, under the condition that the number n of basic units and the respective zero offset angles $\theta_{01}$ and $\theta_{02}$ are known, the steady state number and steady state position of the mechanism according to the present invention mainly depend on the following formula:

$$\begin{cases} r = \dfrac{K_2}{K_1}; \\ f_1 = \dfrac{\theta_1 - \theta_{01}}{\tan(\theta_1)}; \\ f_2 = \dfrac{\theta_2 - \theta_{02}}{\tan(\theta_2)}; \\ \dfrac{dU_r}{d\tau} = K_1 \cdot \dfrac{d\theta_1}{d\tau} \cdot \tan(\theta_1) \cdot (f_1 - r \cdot f_2); \\ r - \dfrac{f_1}{f_2} = 0; \end{cases}$$

In the figure, the mechanism is described in detail with regard to the specific conditions of the number of basic units n=4, zero offset $\theta_{01}$=0.005$\pi$, $\theta_{01}$=0.01$\pi$. By analyzing the intersection point 302 of the stiffness ratio r=3 and the curve $f_1/f_2$ (301 shown in the figure), all the stagnation points of the potential energy function of the mechanism can be obtained. Combining the product sign of the three of $d\theta_1/d\tau$ and $\theta_1$ (303 shown in the figure) and $f_2$, the steady-state number and steady-state position of the mechanism can be determined from all stagnation points of the potential energy function: (1) If the sign of the product of the ($d\theta_1/d\tau$, $\theta_1$, and $f_2$) is positive, the positive crossing point of curve 301 and straight line 3 from bottom to top is the steady-state position of the mechanism; (2) If the sign of the product of the ($d\theta_1/d\tau$, $\theta_1$, and $f_2$) is negative, the negative crossing point of curve 301 and straight line 3 from top to bottom is the steady-state position of the mechanism.

Figure 4:
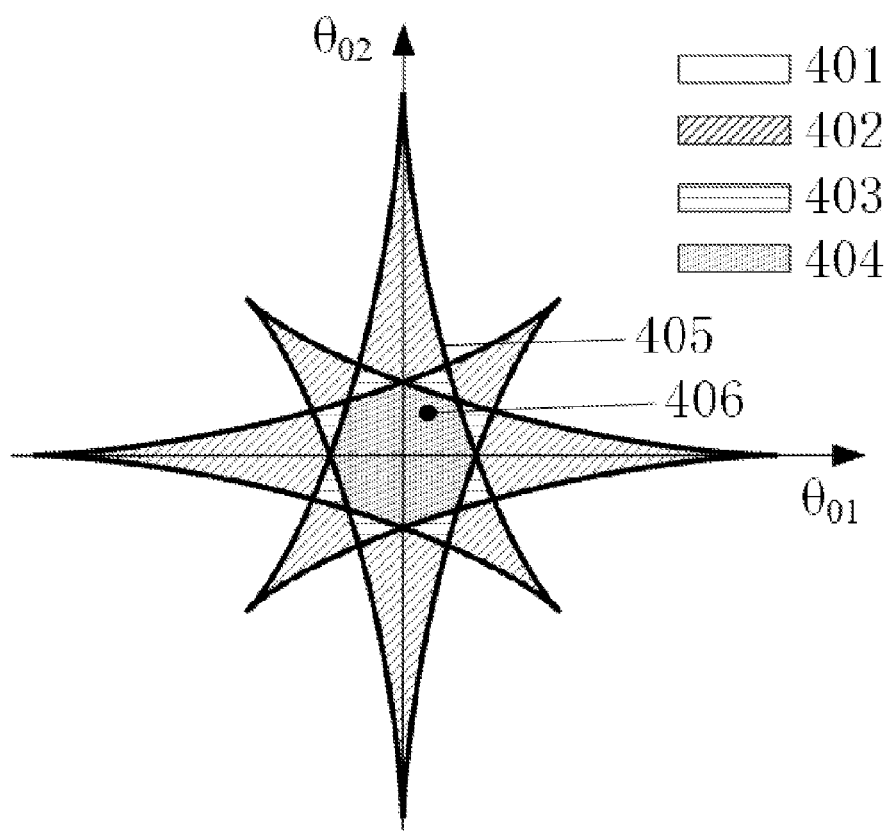
FIG. 4 is a diagram of the analysis of the number of steady states in the case where the number of the basic units and the stiffness ratio of basic units of the present invention are known.

As shown in FIG. 4, when fixing the number of basic units n and the stiffness ratio r, by determining or changing the zero offsets $\theta_{01}$ and $\theta_{02}$ of the base unit, the steady state number and steady state positions of the mechanism described in the present invention can be intuitively analyzed and controlled.

The plane formed by the parameters $\theta_{01}$ and $\theta_{02}$ can be divided into a monostable area 401, a bistable area 402, a tri-stable area 403, and a quad-stable area 404 according to the number of steady states exhibited by the mechanism. The parameterized formula of the boundary curve 405 dividing these areas is:

$$\begin{cases} \theta_{01} = \theta_1 - \dfrac{\theta_2' \cdot (\theta_1'^2 + r \cdot \theta_2'^2)}{\theta_1' \cdot \theta_2'' - \theta_2' \cdot \theta_1''}; \\ \theta_{02} = \theta_2 - \dfrac{\theta_1' \cdot (\theta_1'^2 + r \cdot \theta_2'^2)}{r \cdot (\theta_2' \cdot \theta_1'' - \theta_1' \cdot \theta_2'')}; \\ \theta_i' = \dfrac{d\theta_i}{d\tau}, (i = 1, 2); \\ \theta_i'' = \dfrac{d^2\theta_i}{d\tau^2}, (i = 1, 2); \end{cases}$$

The specific parameters of the mechanism analyzed in the figure are as follows: n=4, r=1. For a set of determined $\theta_{01}$ and $\theta_{02}$, the point ($\theta_{01}$, $\theta_{02}$) locates in the steady-state area in the figure, and the mechanism using these parameters behaves as a responsive steady state. Taking the specific point 406 in the figure as an example, if the mechanism of the present invention adopts the parameters at this point, the mechanism will behave in a quad-stable performance.

Figure 5:
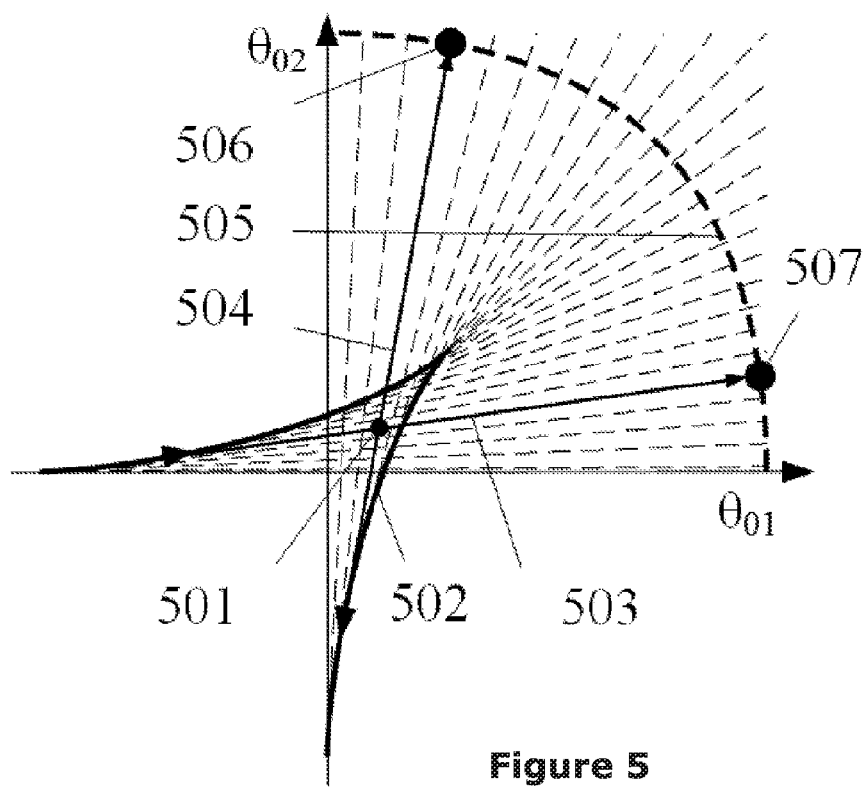
FIG. 5 is a diagram of the analysis of the steady-state position when the number of the basic units and the stiffness ratio of basic units of the present invention are known.

As shown in FIG. 5, when the number n of basic units and the stiffness ratio r are fixed, and after the steady-state number of the mechanism of the present invention is determined by the steady-state distribution diagrams of $\theta_{01}$ and $\theta_{02}$, then the steady-state position of the mechanism can be determined through the tangent aspect of the curve. Taking point 501 in the figure as an example, according to the curve direction 502, there are two tangents 503, 504. The intersection points 506, 507 of the curve and the kinematic relationship curve 505 formed by $\theta_1$ and $\theta_2$ are the steady-state positions of the mechanism. The steady state positions uniquely correspond to rotational angle $\tau$. $\theta_1$ and $\theta_2$ at the intersections can be used to solve the specific rotational angle according to the following formula:

$$\begin{cases} \theta_1 = 2\arccos\left(\dfrac{\cos\left(\dfrac{\varphi}{2}\right)}{\cos\left(\dfrac{\theta_2}{2}\right)}\right)\text{sign}(\sin(\tau)) \\ \theta_2 = 2\arcsin\left(\sin(\tau)\sin\left(\dfrac{\varphi}{2}\right)\right) \\ \varphi = \dfrac{2\pi}{n} \end{cases}$$

Figure 6:
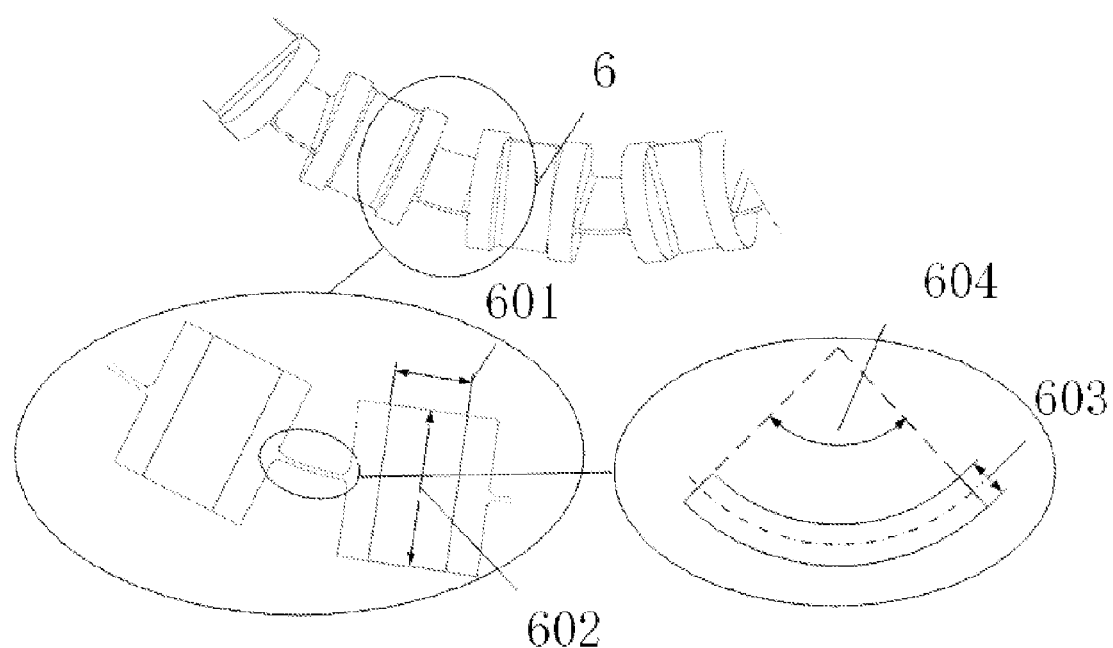
FIG. 6 is a diagram of a hinge of a specific embodiment of the present invention.

Referring to FIG. 6, the present invention can directly use straight beam flexible hinges to realize corresponding functions. The straight beam type flexible hinge is a thin sheet 6 with a rectangular cross section, wherein the length L (601 shown in the figure), the width b (602 shown in the figure), and the thickness h (603 in the figure) of the straight beam type flexible hinge and the Young's modulus E of the material can be used to change the stiffness of the flexible hinges according to the following formula:

$$\begin{cases} K_i = \dfrac{EI}{L}, (i = 1, 2); \\ I = \dfrac{bh^3}{12}; \end{cases}$$

The zero offset angle of the hinge can be formed by bending the initial shape of the straight beam type flexible hinge into a circular arc, and the angle 604 of the circular arc is the zero offset angle $\theta_{01}$ $\theta_{02}$ of the hinge.

Figure 7:
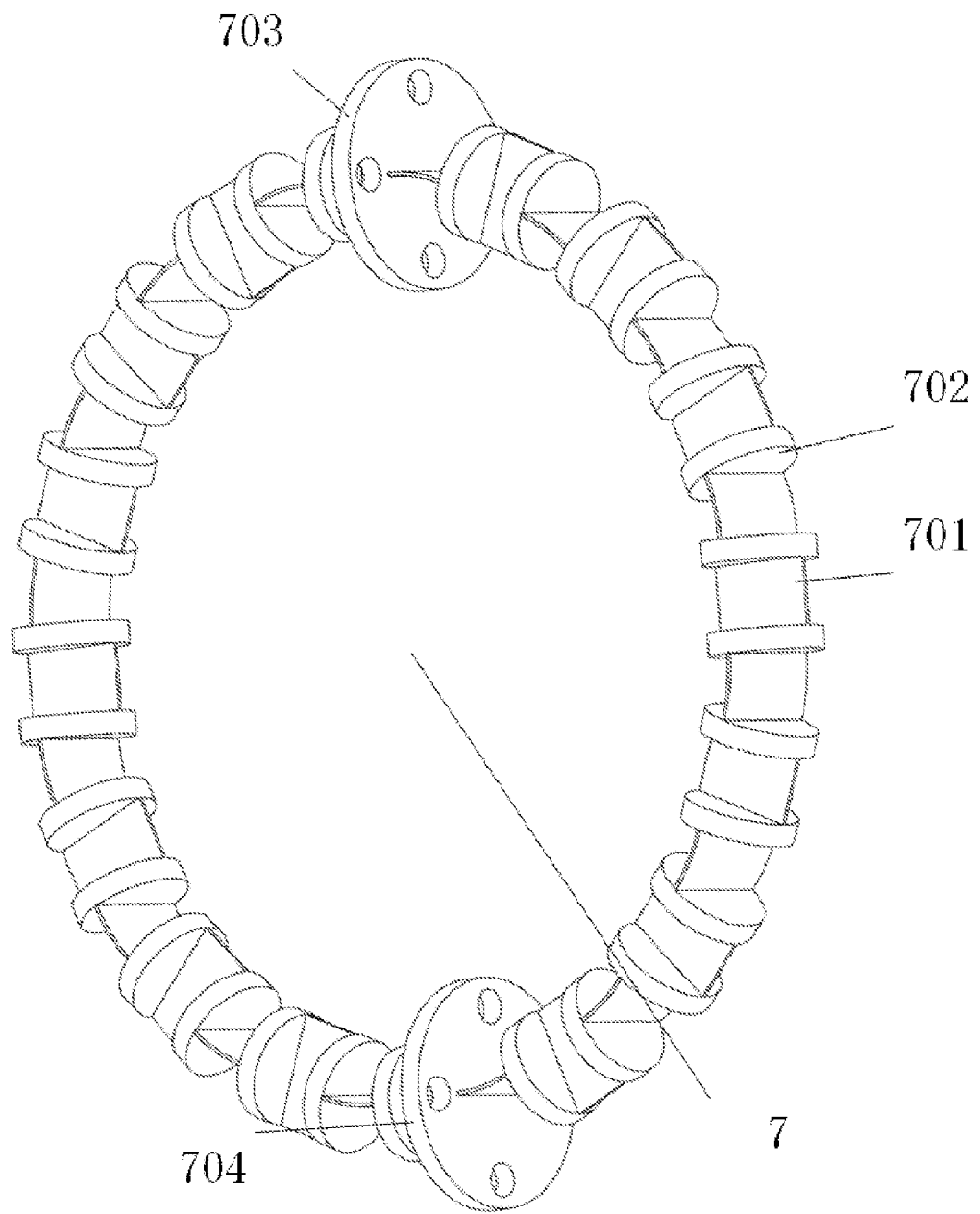
FIG. 7 is an overall diagram of a specific embodiment of the present invention.

Referring to FIG. 7, it is a specific structure 7 of the present invention using straight beam flexible hinges, which includes a straight beam flexible hinge 701 that are straightly distributed and perpendicular to each other on different planes, a fixing structure 702 connecting two adjacent hinges, and driving torque input and output terminals 703, 704. The structure can be used directly in the design of climbing rod robot, pipeline robot, tunnel robot, etc. Its multi-steady state manner can greatly improve the reliability of movement.

The following is a steady-state analysis method of the above multistable compliant mechanism of this embodiment, comprises the following steps:

1) determining a number n of basic units, a basic shape and a basic size of each basic unit can vary, but corresponding stiffness of its flexible hinges that perpendicular to each other on different planes must be the same;

2) determining a type of flexible hinges of a basic unit, and according to the determined type of flexible hinges, combining relevant theory of compliant mechanism to determine its stiffness $K_1$, $K_2$ and the ratio r between them, if the selected flexible hinges are straight beam flexible hinges, their stiffness is obtained according to the following formula:

$$\begin{cases} K_i = \dfrac{EI}{L}, (i = 1, 2); \\ I = \dfrac{bh^3}{12}; \end{cases}$$

where E is the Young's modulus of the material of the straight beam type flexible hinges, b and h are respectively the cross-sectional width and thickness of a straight beam flexible hinge, and I is the cross-sectional moment of inertia of a straight beam flexible hinge;

3) determining zero offset angles $\theta_{01}$ and $\theta_{02}$ of the flexible hinges of the basic unit of the mechanism, according to the following formula:

$$\begin{cases} r = \dfrac{K_2}{K_1}; \\ f_1 = \dfrac{\theta_1 - \theta_{01}}{\tan(\theta_1)}; \\ f_2 = \dfrac{\theta_2 - \theta_{02}}{\tan(\theta_2)}; \end{cases}$$

4) drawing curves of the term $f_1/f_2$, and find an intersection point of it with the stiffness coefficient ratio r of the flexible hinges of the basic unit, if intersection point cannot be found or the curves of $f_1/f_2$ cannot be obtained, then directly go to step 6);

5) finding a steady-state point of the mechanism according to a numerical sign of the following expression:

$$K_1 \cdot \dfrac{d\theta_1}{d\tau} \cdot \tan(\theta_1)$$

if it is positive, the steady-state point appears at a point where the function $f_1/f_2$ crosses r positively from bottom to top; if it is negative, the steady-state point appears at a point where the function $f_1/f_2$ crosses r negatively from top to bottom; after the steady state point is determined, if there is only one steady-state point, the mechanism is a monostable mechanism; if there are two steady-state points, the mechanism is a bistable mechanism; if there are three steady-state points, the mechanism is a tri-stable mechanism; if there are four steady-state points, the mechanism is a quad-stable mechanism; wherein the rotational angle $\tau$ corresponds to a steady-state point above is a steady-state position of the mechanism;

6) drawing a plot according to the parameterized formula of a steady-state area boundary curve of the following formula:

$$\begin{cases} \theta_{01} = \theta_1 - \dfrac{\theta_2' \cdot (\theta_1'^2 + r \cdot \theta_2'^2)}{\theta_1' \cdot \theta_2'' - \theta_2' \cdot \theta_1''}; \\ \theta_{02} = \theta_2 - \dfrac{\theta_1' \cdot (\theta_1'^2 + r \cdot \theta_2'^2)}{r \cdot (\theta_2' \cdot \theta_1'' - \theta_1' \cdot \theta_2'')}; \\ \theta_i' = \dfrac{d\theta_i}{d\tau}, (i = 1, 2); \\ \theta_i'' = \dfrac{d^2\theta_i}{d\tau^2}, (i = 1, 2); \end{cases}$$

determining a position of the point ($\theta_{01}$, $\theta_{02}$) corresponding to the zero offset angles $\theta_{01}$ and $\theta_{02}$ of the flexible hinges of actual basic units, and determining a steady-state area where it falls, then determining a number of its steady-state, if the point locates in the monostable area, the mechanism is a monostable mechanism; if the point locates in a bistable area, the mechanism is a bistable mechanism; if the point locates in a tri-stable area, the mechanism is a tri-stable mechanism; if the point locates in a quad-stable area, the mechanism is a quad-stable mechanism; finding tangents of the boundary curve of the steady-state area passing through the point ($\theta_{01}$, $\theta_{02}$), and finding intersection points of these tangents and kinematics curves of $\theta_1$ and $\theta_2$, these intersection points are the steady-state points of the mechanism;

$$\begin{cases} \theta_1 = 2\arccos\left(\dfrac{\cos\left(\dfrac{\varphi}{2}\right)}{\cos\left(\dfrac{\theta_2}{2}\right)}\right)\text{sign}(\sin(\tau)) \\ \theta_2 = 2\arcsin\left(\sin(\tau)\sin\left(\dfrac{\varphi}{2}\right)\right) \\ \varphi = \dfrac{2\pi}{n} \end{cases}$$

finally, finding a steady-state position corresponding to a steady-state point of the mechanism according to the above formula.

It can be seen from FIGS. 1 and 2 that the present invention belongs to a type of centralized flexible hinges. Although the movement relationship is similar to the corresponding rigid mechanism, the multistable compliant mechanism provided by the present invention has a force constraint caused by the elastic deformation of the flexible hinge. Even with multiple degrees of freedom in the mechanism, a single r can still be used to achieve continuous rotational motion. Since the flexible hinge has no specific structural limitations, the number of basic units and the shape of the basic unit are variable, the present invention can adapt to different working conditions and has strong potential application value.

It can be seen from FIGS. 3 to 5, the steady-state manner of the present invention is related to the stiffness, the ratio of the stiffness, the respective zero offset angles of two adjacent flexible hinges of the basic unit, and the number of their units. The steady-state performance analysis method of the multistable compliant mechanism of the present invention is simple and intuitive. Not only can it analyze the steady-state performance of known mechanisms, but also can design and control the number of steady-state and positions of steady-state of the multi-stable compliant mechanism.

It can be seen from FIGS. 6 to 7 that the present invention can be implemented using a common compliant hinge. It has a lower design threshold and is more practical.

The invention inherits the characteristics of the continuous rotation and multi-steady state of the existing three fold kaleidocycles compliant mechanism, and has the advantages of variable mechanism topology, measurable, controllable and adjustable steady state manner etc. Therefore, it can be directly applied to the posture maintaining devices such as solar panels, solar sails, antennas, new blood vessel supports, etc. and can also be used in the design of rod climbing robots, pipeline robots, tunnel robots, and metamorphic robots, and has huge potential application value.

In summary, the present invention can effectively complete the functions of continuous rotation and multistability etc. of the compliant mechanism, and the topology of the mechanism is variable. The steady-state performance and the steady-state position are measurable, controllable, and adjustable, particularly suitable for complex working conditions. Therefore, compared with the prior art, the present invention is a new multistable compliant mechanism with simple structure, reliable motion and simple use, which is worthy of promotion.

The above-mentioned embodiments are only preferred embodiments of the present invention, and are not intended to limit the scope of the present invention. Therefore, any changes made according to the shape and principle of the present invention should be included in the protection scope of the present invention.

The invention claimed is:

1. A multistable compliant mechanism comprising:
   multiple basic units connected sequentially front to end to form a closed annular structure;
   each basic unit comprising two flexible hinges perpendicular to each other on different planes, and two rigid connection parts for connecting the two flexible hinges, wherein the two flexible hinges are connected by a rigid connection part, and one of the two flexible hinges is connected to a flexible hinge of an adjacent basic unit through the other rigid connection part, wherein lengths of the two rigid connection parts in the basic unit are equal, and lengths of rigid connection parts of different basic units may be equal or not equal.

2. The multistable compliant mechanism according to claim 1, wherein the multistable compliant mechanism has four types: monostable, bistable, tristable, and quad-stable; wherein each basic unit meets size constraints according to a first formula:

$$\frac{\omega_{01}}{\omega_{02}} = \frac{\cos(\theta_{n+1})}{\cos(\theta_{n-1})} \cdot \left(\frac{L_{n-1} + L_n \cos(\theta_n)}{L_n + L_{n-1} \cos(\theta_n)}\right)$$

wherein, $\omega_{01}$ and $\omega_{02}$ are input and output rotational angular velocities of the basic unit, $L_{n-1}$ and $L_n$ are the lengths of the two rigid connection parts in the basic unit, $\theta_{n-1}$ and $\theta_n$ are deflection angles of the two flexible hinges in the basic unit, $\theta_{n+1}$ is a joint offset angle between a next basic unit and a current basic unit;

wherein to form the closed annular structure, each basic unit has a same rotational angular velocity according to the first formula, and then forms an annular structure that can be rotated stably;

wherein the two adjacent hinges of each basic unit have a same angle change rules, and a kinematic relationship according to:

$$\begin{cases} \theta_1 = 2\arccos\left(\frac{\cos\left(\frac{\varphi}{2}\right)}{\cos\left(\frac{\theta_2}{2}\right)}\right) \text{sign}(\sin(\tau)) \\ \theta_2 = 2\arcsin\left(\sin(\tau)\sin\left(\frac{\varphi}{2}\right)\right) \\ \varphi = \frac{2\pi}{n} \end{cases}$$

wherein, $\theta_1$ and $\theta_2$ are the deflection angles of the two flexible hinges of the basic unit, $\tau$ is a rotational angle of the multistable compliant mechanism relative to an initial position, n is a number of basic units of the multistable compliant mechanism, and $\varphi$ is a constant related to n;

wherein steady-state positions of the multistable compliant mechanism are located at points where a potential energy of the multistable compliant mechanism is minimum according to:

$$\begin{cases} U = n\left(K_1 \cdot \frac{(\theta_1 - \theta_{01})^2}{2} + K_2 \cdot \frac{(\theta_2 - \theta_{02})^2}{2}\right); \\ U_r = \frac{U}{n}; \\ r = \frac{K_2}{K_1}; \\ f_1 = \frac{\theta_1 - \theta_{01}}{\tan(\theta_1)}; \\ f_2 = \frac{\theta_2 - \theta_{02}}{\tan(\theta_2)}; \\ \frac{dU_r}{d\tau} = K_1 \cdot \frac{d\theta_1}{d\tau} \cdot \tan(\theta_1) \cdot (f_1 - r \cdot f_2); \\ \frac{d^2 U_r}{d\tau^2} = 0; \\ \frac{dU_r}{d\tau} > 0; \end{cases}$$

wherein, U is an overall strain energy of the multistable compliant mechanism, $U_r$ is a total strain energy of the basic unit, $K_1$ and $K_2$ are respectively stiffness of the two flexible hinges of the basic unit, $\theta_1$ and $\theta_2$ are respectively the deflection angles of the two flexibility hinges of the basic unit, $\theta_{01}$ and $\theta_{02}$ are zero offset angles of the two flexible hinges of the basic unit, r represents a ratio of stiffness coefficients of the two flexible hinges of the basic unit, $f_1$ and $f_2$ are respectively related to $\theta_{01}$, $\theta_1$ and $\theta_{02}$, $\theta_2$, and are used to analyze a steady-state transition function of the multistable compliant mechanism;

wherein a plane formed by parameters $\theta_{01}$ and $\theta_{02}$ can be divided into a monostable area, a bistable area, a tri-stable area, and a quad-stable area according to a number of steady-states represented by the multistable compliant mechanism, and a parameterized formula of a boundary-curve:

$$\begin{cases} \theta_{01} = \theta_1 - \dfrac{\theta_2' \cdot (\theta_1'^2 + r \cdot \theta_2'^2)}{\theta_1' \cdot \theta_2'' - \theta_2' \cdot \theta_1''}; \\ \theta_{02} = \theta_2 - \dfrac{\theta_1' \cdot (\theta_1'^2 + r \cdot \theta_2'^2)}{r \cdot (\theta_2' \cdot \theta_1'' - \theta_1' \cdot \theta_2'')}; \\ \theta_i' = \dfrac{d\theta_i}{d\tau}, i = 1, 2; \\ \theta_i'' = \dfrac{d^2\theta_i}{d\tau^2}, i = 1, 2; \end{cases}$$

wherein $\theta_1'$ and $\theta_1''$ are respectively a first derivative and a second derivative of $\theta_1$ with respect to the rotational angle $\tau$, $\theta_2'$ and $\theta_2''$ are respectively a first derivative and a second derivative of $\theta_2$ with respect to the rotational angle $\tau$; along a direction of a curve, a number of tangents passing through coordinate point ($\theta_{01}$, $\theta_{02}$) corresponding to specific values of multistable compliant mechanism parameters $\theta_{01}$ and $\theta_{02}$ is the number of steady-states of the multistable compliant mechanism; and an intersection of the number of tangents and a kinematic relationship curve formed by $\theta_{01}$ and $\theta_{02}$ is a steady-state position of the multistable compliant mechanism.

3. The multistable compliant mechanism according to claim 1, wherein the two flexible hinges are spring hinges, straight beam flexible hinges or notch flexible hinges.

4. The multistable compliant mechanism according to claim 1, wherein the two rigid connection parts are connecting rods.

5. A steady-state analysis method for the multistable compliant mechanism according to claim 1, comprising the following steps:

1) determining a number n of basic units, wherein a basic shape and a basic size of each basic unit can vary, but corresponding rigidity coefficients of the two flexible hinges of the basic unit perpendicular to each other on different planes are the same;

2) determining a type of the two flexible hinges of the basic unit, and according to the determined type of the two flexible hinges, combining relevant theory of compliant mechanism to determine stiffness $K_1$, $K_2$ and stiffness coefficient ratio r;

3) determining zero offset angles $\theta_{01}$ and $\theta_{02}$ of the two flexible hinges of the basic unit of the multistable compliant mechanism, according to:

$$\begin{cases} r = \dfrac{K_2}{K_1}; \\ f_1 = \dfrac{\theta_1 - \theta_{01}}{\tan(\theta_1)}; \\ f_2 = \dfrac{\theta_2 - \theta_{02}}{\tan(\theta_2)}; \end{cases}$$

wherein $\theta_{01}$ and $\theta_{02}$ are deflection angles of the two flexible hinges of the basic unit, and f1 and f2 are respectively related to $\theta_{01}$, $\theta_{01}$ and $\theta_{02}$, $\theta_{02}$;

4) drawing a plot of $f_1/f_2$, and find all intersection points with the stiffness coefficient ratio r of the flexible hinges of the basic unit, wherein, when an intersection point cannot be found or the plot of $f_1/f_2$ cannot be drawn, then directly go to step 6);

5) finding a steady-state point of the multistable compliant mechanism according to a numerical sign of expression:

$$K_1 \cdot \dfrac{d\theta_1}{d\tau} \cdot \tan(\theta_1)$$

wherein, when the numerical sign of the expression is positive, the steady-state point appears at a point where $f_1/f_2$ crosses r positively from bottom to top; and when the numerical sign of the expression is negative, the steady-state point appears at a point where $f_1/f_2$ crosses r negatively from top to bottom; wherein after the steady state point is determined, when there is only one steady-state point, the multistable compliant mechanism is a monostable mechanism; when there are two steady-state points, the multistable compliant mechanism is a bistable mechanism; when there are three steady-state points, the multistable compliant mechanism is a tri-stable mechanism; when there are four steady-state points, the multistable compliant mechanism is a quad-stable mechanism; wherein a rotational angle $\tau$ corresponds to a steady-state point of the multistable compliant mechanism;

6) drawing an image according to parameterized formulas of a steady-state area boundary curve:

$$\begin{cases} \theta_{01} = \theta_1 - \dfrac{\theta_2' \cdot (\theta_1'^2 + r \cdot \theta_2'^2)}{\theta_1' \cdot \theta_2'' - \theta_2' \cdot \theta_1''}; \\ \theta_{02} = \theta_2 - \dfrac{\theta_1' \cdot (\theta_1'^2 + r \cdot \theta_2'^2)}{r \cdot (\theta_2' \cdot \theta_1'' - \theta_1' \cdot \theta_2'')}; \\ \theta_i' = \dfrac{d\theta_i}{d\tau}, (i = 1, 2); \\ \theta_i'' = \dfrac{d^2\theta_i}{d\tau^2}, (i = 1, 2); \end{cases}$$

determining a position of a point ($\theta_{01}$, $\theta_{02}$) corresponding to the zero offset angles $\theta_{01}$ and $\theta_{02}$ of the flexible hinges of actual basic units, and determining a steady-state area; determining a number of the steady-state, when the point locates in the monostable area, the multistable compliant mechanism is the monostable mechanism; when the point locates in a bi-stable area, the multistable compliant mechanism is the bistable mechanism; when the point locates in a tri-stable area, the multistable compliant mechanism is the tri-stable mechanism; when the point locates in a quad-stable area, the multistable compliant mechanism is the quad-stable mechanism; finding tangents of the boundary curve of the steady-state area passing through the point ($\theta_{01}$, $\theta_{02}$), and finding intersection points of the tangents and kinematics relationship curves of $\theta_1$ and $\theta_2$, the intersection points are the steady-state points of the multistable compliant mechanism; and finally, finding a steady-state position corresponding to the steady-state point of the multistable compliant mechanism according to:

$$\begin{cases} \theta_1 = 2\arccos\left(\dfrac{\cos\left(\dfrac{\varphi}{2}\right)}{\cos\left(\dfrac{\theta_2}{2}\right)}\right)\text{sign}(\sin(\tau)) \\ \theta_2 = 2\arcsin\left(\sin(\tau)\sin\left(\dfrac{\varphi}{2}\right)\right) \\ \varphi = \dfrac{2\pi}{n} \end{cases}$$

wherein $\varphi$ is a constant related to n.

\* \* \* \* \*